United States Patent

Kasperkovitz

[15] 3,676,701

[45] July 11, 1972

[54] SHIFT REGISTER

[72] Inventor: Wolfdietrich Georg Kasperkovitz, Emmasingel, Endhoven, Netherlands

[73] Assignee: U.S. Philips Corporation, New York, N.Y.

[22] Filed: April 1, 1971

[21] Appl. No.: 130,186

[30] Foreign Application Priority Data

April 3, 1970 Netherlands..........................7004766

[52] U.S. Cl. ..........................307/221 R, 307/224, 307/303

[51] Int. Cl. ...................................G11c 19/00, H03k 23/08

[58] Field of Search...................301/221 R, 223 R, 224, 303

[56] References Cited

UNITED STATES PATENTS 3,297,950 1/1967 Lee ..................................307/221 R

*Primary Examiner*—John Zazworsky

*Attorney*—Frank R. Trifari

[57] ABSTRACT

A shift register comprising a sequence of shift register elements which each include a first and a second transistor the emitters of which are interconnected and have clock pulse signals applied to them. The base of the second transistor and the collector of the first transistor of each of the shift register elements are interconnected. The base of the first transistors of all the shift register elements are connected to a point of reference potential, whilst the collector of second transistor of each of the shift register elements is connected to the collector of the first transistor of the succeeding shift register element.

5 Claims, 5 Drawing Figures

Figure 1:
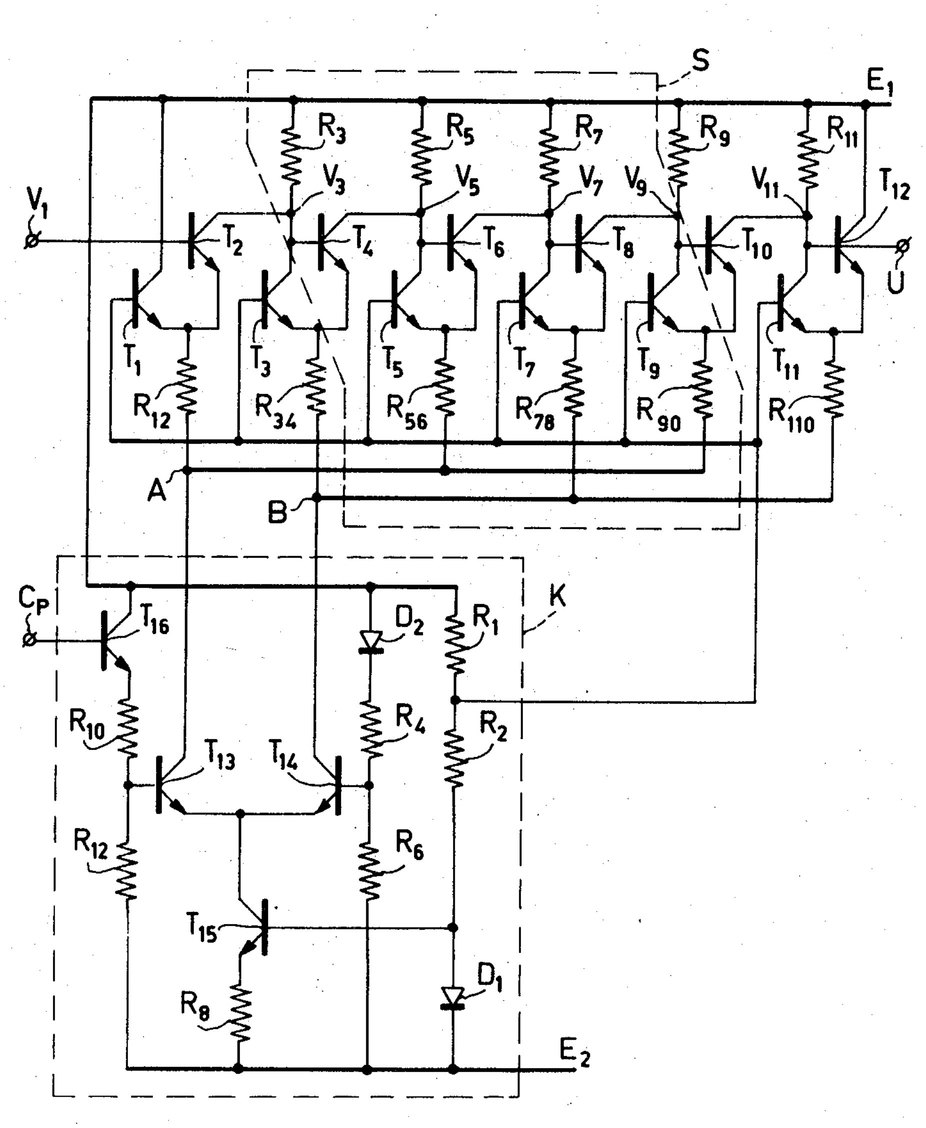

INVENTOR.
WOLFDIETRICH G. KASPERKOVITZ
BY
Frank R. Jifan
AGENT

INVENTOR.
WOLFDIETRICH G. KASPERKOVITZ

BY

AGENT

INVENTOR.
WOLFDIETRICH G. KASPERKOVITZ

BY

AGENT

INVENTOR.
WOLFDIETRICH G. KASPERKOVITZ

BY

AGENT

INVENTOR.
WOLFDIETRICH G. KASPERKOVITZ
BY
AGENT

SHIFT REGISTER

The invention relates to a shift register comprising a sequence of shift register elements which each include a first and a second transistor the emitters of which are interconnected, means being provided for applying a clock pulse to these emitters, whilst the base of the second transistor is connected to the collector of the first transistor. More particularly the invention relates to a shift register composed of a large number of shift register elements integrated in a semiconductor body. Present-day shift register tend to become even smaller by the use of integrated shift register elements. The object of this miniaturization is to reduce the cost and to increase the speed of operation. The reduction in size of the shift register entails an increase in the packing density and hence in the energy dissipation per unit of the surface area of the semiconductor body. The quotient of the maximum operating speed and the dissipation is a measure of the quality of the relevant shift register. In general the tendency will be to make this quotient as large as possible.

In a known shift register of the type described each shift register element includes a third and a fourth transistor. The emitters of the third and fourth transistors are jointly connected to a clock pulse generator via a current-determining element. The collector of the third transistor is connected to the collector of the first transistor, and the collector of the fourth transistor is connected to the collector of the second transistor. The base of the fourth transistor is connected to the collector of the first transistor of the succeeding shift register element, and the base of the third transistor is connected to the collector of the second transistor of the succeeding shift register element. The information is shifted according to the master-slave principle. A bit unit (= 2 shift-register elements) of the said known shift register comprises 8 transistors and when integrated requires the provision of 8 mutually isolated semiconductor islands. Obviously, it will be difficult to integrate this known shift register so as to achieve a high bit density, which term is to be understood to mean the number of bit units per unit of the surface area of the integrated circuit.

Further, in the said known shift register the dissipation per bit unit will be large, because a bit unit of this shift register draws current both when in the master state and when in the slave state. Consequently, the quotient of the maximum operating speed expressed in MHz and the dissipation expressed in mW, which quotient sometimes is referred to as the speed power ratio, of this shift register will be small. In many cases the value of the speed/power ratio of shift registers of this type is 10.

In a known, slow shift register which operates in the saturation mode, the base of the first transistor is connected to the collector of the second transistor. The collector of the first transistor is connected to the collector of the second transistor of the succeeding shift register element via a diode. The collector of the second transistor is connected to the collector of the first transistor of the succeeding shift register element via a diode. In this known shift register each bit unit comprises four transistors, two diodes and several further components, such as resistors. Integration of such a bit units requires the use of four semi-conductor islands, allowing a higher bit density to be obtained than in the aforementioned fast shift register. In spite of the fact that in this shift register each bit unit when in the slave state draws less current than in the aforementioned shift register, the speed/power ratio of this shift register is found to be smaller than that of the aforementioned shift register. This is due to the fact that the shift register operates in the saturation mode. In shift registers of this type the value of the speed power ratio frequency is 2,5.

It is an object of the present invention to obviate the aforedescribed disadvantages and to provide a shift register which has both a high speed/power ratio and a high bit density. A shift register according to the invention is characterized in that means are provided for applying a reference potential to the base of the first transistor, the collector of the second transistor being connected to the collector of the first transistor of a shift register element succeeding the said shift register element.

Figure 2:
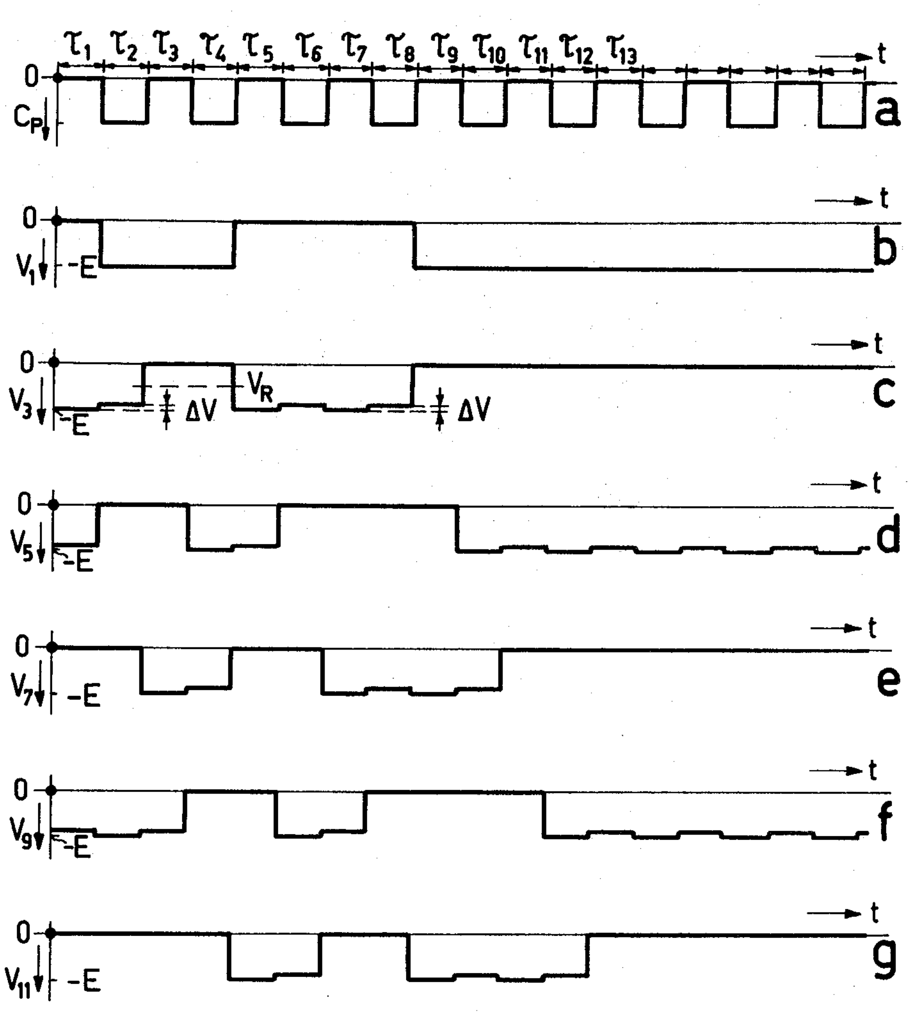
Figure 3:
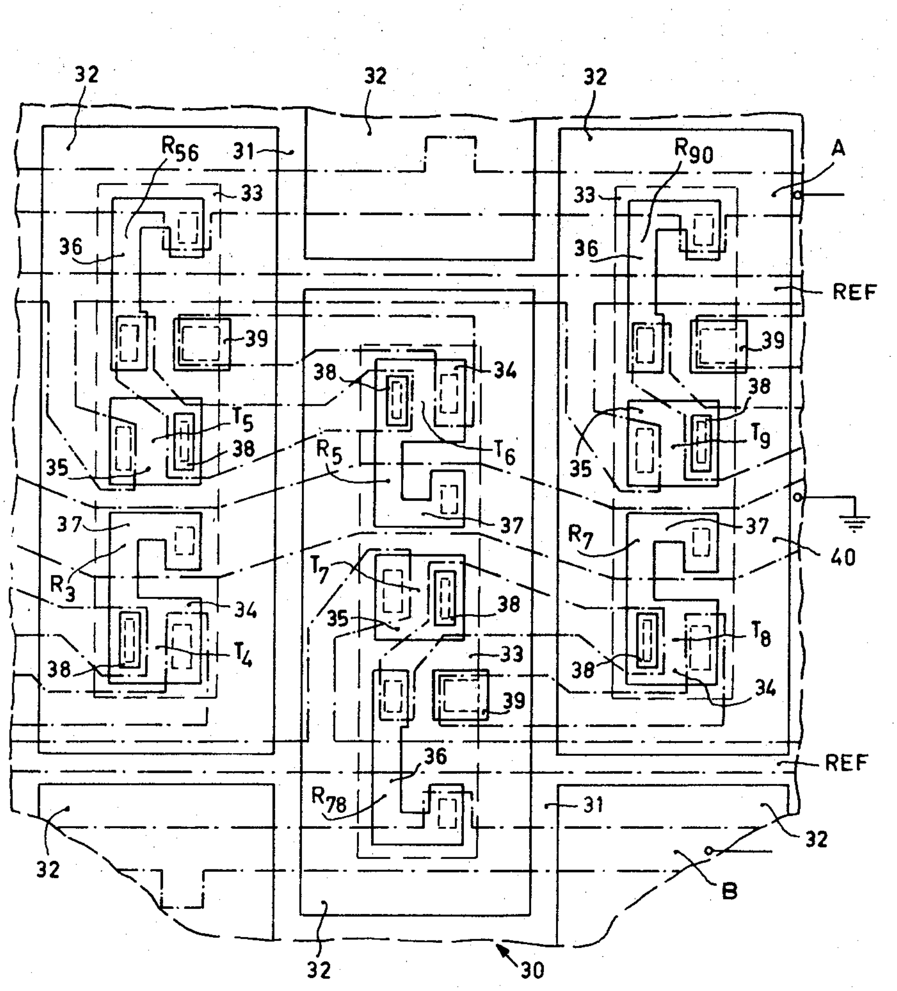
Figure 4:
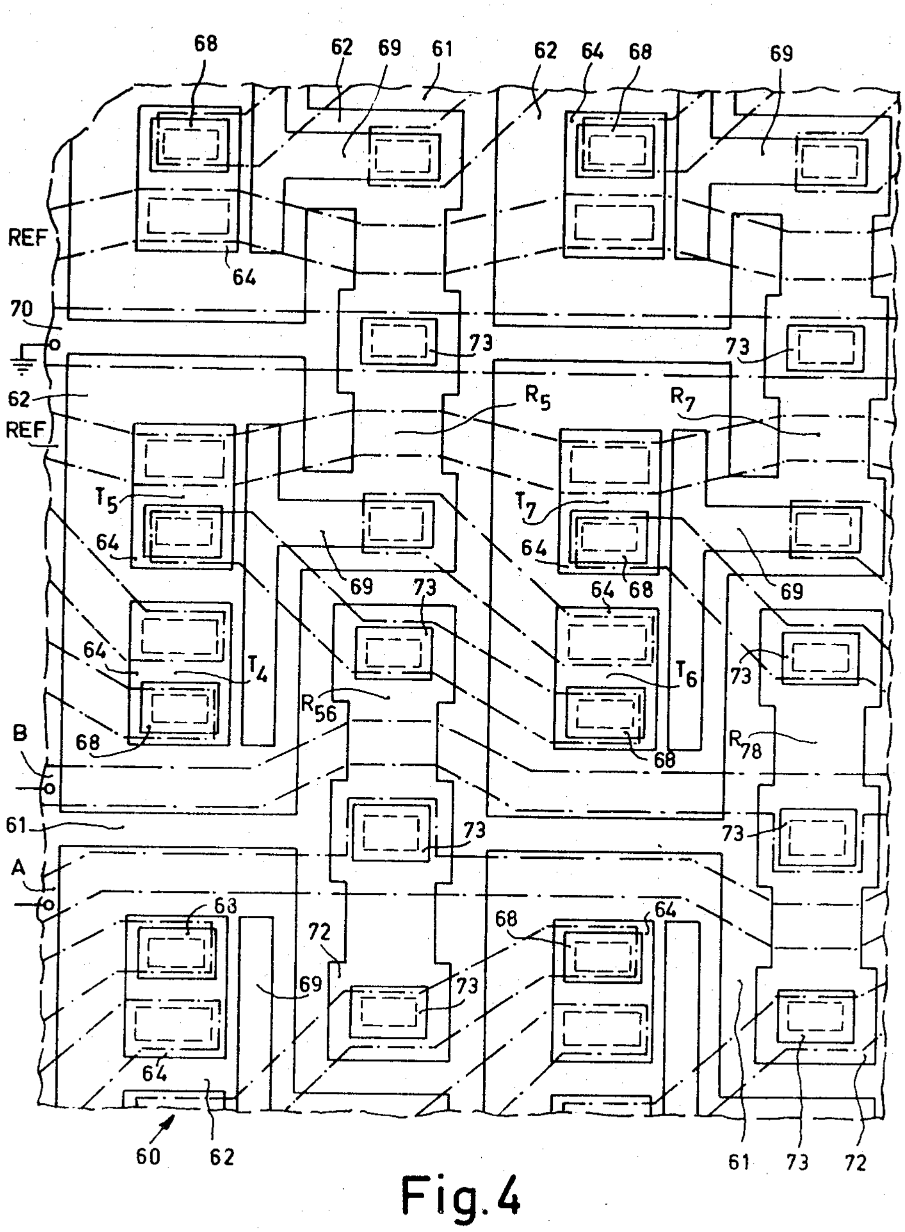

Embodiments of the invention will now be described, by way of example, with reference to the accompanying diagrammatic drawings, in which:

FIG. 1 is the circuit diagram of a shift register according to the invention, FIG. 2 shows the wave forms of voltages which are produced at various points of the shift register, FIG. 3 is a schematic top plan view of an embodiment of an integrated shift register according to the invention, and FIG. 4 is a schematic top plan view of an other embodiment of an integrated shift register according to the invention.

Figure 5:
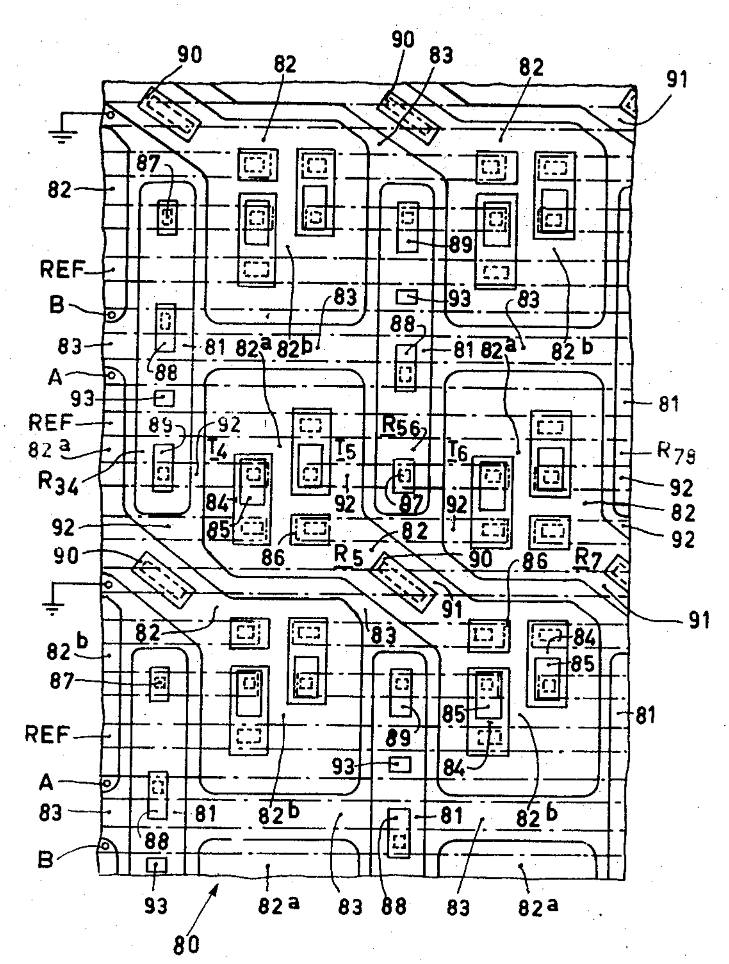

FIG. 5 is a schematic top plan view of a third embodiment of an integrated-circuit shift register according to the invention.

The shift register shown in FIG. 1 comprises six shift register elements. The first shift register element includes a first transistor $T_1$ and a second transistor $T_2$, the second shift register element includes a first transistor $T_3$ and a second transistor $T_4$, the third shift register element includes a first transistor $T_5$ and a second transistor $T_6$, the fourth shift register element includes a first transistor $T_7$, and a second transistor $T_8$, the fifth shift register element includes a first transistor $T_9$ and a second transistor $T_{10}$, and the sixth shift register element includes a first transistor $T_{11}$ and a second transistor $T_{12}$. The bases of the first transistors of the said six shift register elements are connected to the junction point of resistors $R_1$ and $R_2$, the terminal of the resistor $R_1$ not connected to the junction point being connected to a point $E_1$ of reference potential, for example 0 volts. The terminal of the resistor $R_2$ not connected to the said junction point is connected to a point $E_2$ of constant potential via a diode $D_1$ and also to the base of a transistor $T_{15}$ the emitter of which is connected to the point $E_2$ via a resistor $R_8$. The collector of the transistor $T_{15}$ is connected to the junction point of the emitters of transistors $T_{13}$ and $T_{14}$. The base of the transistor $T_{14}$ is connected to the point $E_1$ via the series arrangement of a resistor $R_4$ and a diode $D_2$ and also to the point $E_2$ through a resistor $R_6$. The base of the transistor $T_{13}$ is connected to the point $E_1$ via a resistor $R_{10}$ and the emitter-collector path of a transistor $T_{16}$ and also to the point $E_2$ via a resistor $R_{12}$. To the base of the transistor $T_{16}$ there is applied a clock pulse signal $C_p$ as shown in FIG. 2a. The collector of the transistor $T_{13}$ is connected to a clock pulse line A, and the collector of the transistor $T_{14}$ is connected to a clock pulse line B. The emitters of the first and the second transistors of each of the shift register elements are interconnected, the emitters of the transistors of the first, third, and fifth shift register elements being connected to the clock pulse line A via resistors $R_{12}$, $R_{56}$ and $R_{90}$ respectively. The emitters of the transistors of the second, fourth and sixth shift register elements are connected to the clock pulse line B via resistors $R_{34}$, $R_{77}$ and $R_{110}$ respectively. The bases of the transistors $T_4$, $T_6$, $T_8$, $T_{10}$ and $T_{12}$ are connected to the collectors of the transistors $T_3$, $T_5$, $T_7$, $T_9$ and $T_{11}$, respectively. A logical input signal $V_l$ is applied to the base of the transistor $T_2$. The collector of the transistor $T_1$ is connected to the point $E_1$. The collectors of the transistors $T_3$, $T_5$, $T_7$, $T_9$ and $T_{11}$ are connected to the point $E_1$ via resistors $R_3$, $R_5$, $R_7$, $R_9$ and $R_{11}$, respectively. The collectors of the transistors $T_2$, $T_4$, $T_6$, $T_8$ and $T_{10}$ are connected to the collectors of the transistors $T_3$, $T_5$, $T_7$, $T_9$ and $T_{11}$, respectively. The collector of the transistor $T_{12}$ is connected to the point $E_1$. The logical output signal is taken from the collector of the transistor $T_{11}$. FIG. 2. In the time interval $\tau_1$ a clock pulse voltage of about 0 volt, see FIG. *2a*, is applied to the base of the transistor $T_{16}$. The transistor $T_{13}$ will become conductive so that the voltage on the clock pulse line A will be negative. In the time interval $\tau_1$ there is applied to the input $V_1$ of the shift register a logical 1 (= 0 volt), see FIG. *2b*. Consequently, in this time interval the transistor $T_2$ will be conductive and the transistor $T_1$ will be non-conductive. The voltage at a point $V_3$ will be equal to −E volts (= logical 0), see FIG. *2c*. In the time interval $\tau_2$ the clock pulse voltage $C_p$ is negative, so that the transistor $T_{13}$ will not be conductive. Now the transistor $T_{14}$ will become conductive, so that the voltage on the clock pulse line B becomes negative. The second shift register element comprising the transistors $T_3$ and $T_4$ is now switched into circuit. Since in the preceding time interval the voltage at the point $V_3$ was equal to −E volts, the transistor $T_3$ will become conductive in the time interval $\tau_2$. The voltage at a point $V_5$ now is equal to 0 volts, see FIG. 2d. In the time interval $\tau_2$ both the transistor $T_1$ and the transistor $T_2$ are cut off. In the time interval $\tau_3$ a logical 0 is applied to the input of the shift register, see FIG. 2*b*. In this time interval the transistor $T_1$ will become conductive, whilst the transistor $T_2$ will be cut off. The voltage at the point $V_3$ will be equal to 0 volts, see FIG. 2*c*. In the same time interval $\tau_3$ the third shift register element comprising the transistors $T_5$ and $T_6$ is switched into circuit. In the preceding time interval the voltage at the point $V_5$ was equal to 0 volts. The transistor $T_6$ will become conductive, so that the voltage at a point $V_7$ will be equal to −E volts, see FIG. 2*e*. In the time interval $\tau_4$ the transistor $T_7$ will become conductive, because the voltage at the point $V_7$ was equal to −E volts in the preceding time interval. Consequently, the voltage at a point $V_9$ will be equal to E volts, see FIG. 2*f*. In the time interval $\tau_5$ the transistor $T_{10}$ will become conductive, because in the preceding time interval the voltage at the point $V_7$ was equal to −E volts. Consequently, the voltage at the point $V_9$ will be equal to 0 volts, see FIG. 2*f*. Because the transistor $T_{10}$ is conductive in the time interval $\tau_5$, the voltage at a point $V_{11}$ will be equal to −E volts, see FIG. 2g.

In the time intervals $\tau_1$, $\tau_3$, $\tau_5$, $\tau_7$, $\tau_9$ and $\tau_{11}$, the information supplied to the shift register is written into the first shift register element ($T_1$, $T_2$), whilst the information stored in the second element and that stored in the fourth element are transferred to the third and the fifth element respectively. In the said time intervals the transistors of the second, fourth and sixth shift register elements will not be conductive. As a result the dissipation of the shift register shown in FIG. 1 will be particularly low.

In order to prevent bottoming of the transistors, the current I flowing through the collector resistor of each shift register element is chosen so that the voltage produced across the resistor is smaller than the voltage across any one junction. Thus, for example, for the collector resistor $R_3$:

$$I\,R_3 < V_j$$

where $V_j$ is about 0.8 volts in the case of silicon transistors. In addition it has been found that the potential difference $\Delta$ V between two adjacent zero levels, see FIG. 2*c*, is a function of the quotient of the emitter resistor and the collector resistor of the relevant shift register element. $\Delta$ V will decrease in proportion as the said quotient decreases. When the quotient increases, the dissipation per bit unit will increase, and in proportion as the quotient decreases the dissipation will decrease. Furthermore it has been found that the potential difference $\Delta$ V is a function of the reference voltage $V_r$ used, see FIG. 2*c*. In proportion as this reference voltage is chosen to be smaller, i.e. less negative. $\Delta$ V will decrease, and in proportion as $V_r$ is chosen to be larger, i.e. more negative, $\Delta$ V will increase. It has now been found that with a view to slight dissipation and small $\Delta$ V an advantageous value for the quotient is about 1,2 to 2, whilst the reference voltage $V_r$ is preferably chosen to be about equal to one half of the voltage produced across the collector resistors.

Apart from the slight dissipation per bit unit an important advantage of the shift register according to the invention is that per bit unit only four transistors and four resistors are required. For a fast shift register not operating in the saturation mode, the said number of components is exceptionally small. Further the bit-density is beneficially influenced by the fact that the collector of the second transistor of each shift register element is connected to the collector of the first transistor of the succeeding element. This interconnection enables the said two transistors to be realized with a common collector region in the same semiconductor island.

The shift register according to the invention may be integrated in the form shown in top plan view in FIG. 3. In this embodiment a semiconductor body 30 may consist of a P-type silicon substrate on which an N-type epitaxial layer has been provided. In the usual manner the epitaxial layer has been subdivided by means of isolating regions 31 into a plurality of separate N-type islands, a few of which have been designated by 32 in the Figure. Each of these islands contains two transistors and two resistors, and in three of the islands 32 the relative arrangement of the various semiconductor regions of the circuit elements is shown. In FIG. 3, like circuit elements are designated correspondingly to those shown in FIG. 2, and the said three islands 32 include the part of the shift register enclosed by a broken line S in FIG. 2.

The islands 32 include a burried region or burried collector 33 indicated by a broken line, i.e. a low-resistance part which extends at the interface of the substrate and the epitaxial layer. Base regions 34 and 35 and resistance regions 36 have been provided from the uncovered surface of the epitaxial layer. The base regions 34 of the transistors $T_4$, $T_6$ and $T_8$ each have an extended portion 37. These extended portions 37 constitute the resistors $R_3$, $R_5$ and $R_7$ which in the circuit arrangement have been directly connected to the bases of these transistors. This saves space and simplifies the pattern of metallization required for the electric interconnection of the circuit elements.

In the base regions 34 and 35 there have further been made emitter regions 38, whilst at the same time collector contact regions 39 have been produced. The semiconductor body has been coated with an insulating layer on which a pattern of printed wires for the electric interconnection may be provided. Through openings in the insulating layer, which are shown in the drawing by broken lines, the wires make electric contact with the semiconductor regions which reach the surface in the openings. The locations of the wires are shown by dot-dash lines in the Figure. The wire 40 interconnects the resistors $R_3$, $R_5$ and $R_7$ and during operation will be at a reference potential, for example at earth potential. The Figure further shows the clock pulse line A, which has been connected to the resistors $R_{56}$ and $R_{90}$, the clock pulse line B, which has been connected to the resistor $R_{78}$, and reference voltage lines REF, which have been connected to the bases of the transistors $T_5$, $T_7$ and $T_9$. The remaining wires serve to provide internal interconnections between the various circuit elements of the shift register.

The shift register described with reference to FIG. 3 may entirely be manufactured in the manner commonly used in semiconductor technology, whilst the part of the circuit arrangement which has been designated by K in FIG. 2 may simply be integrated at the same time.

An *n*-type epitaxial layer which is about 6 $\mu$m thick and has a resistivity of about 0,3 ohm.cm may be used. The base regions and the resistance regions may be obtained by diffusion of, for example, boron, the sheet resistance being about 200 ohms per square and the penetration depth being about 1,5 $\mu$m. The dimensions of the base regions 34 and 35 may be 30 $\mu$m by 32,5 $\mu$m, whilst the extended portions 37 and the resistance regions 36 may be about 10 $\mu$m wide. The dimensions of the emitter regions 38, which regions may be obtained by diffusion of, for example, phosphorus, may be 10 $\mu$m by 20 $\mu$m and may have a penetration depth of 1 $\mu$m. In the example described, the resistance of the resistors $R_3$, $R_5$ and $R_7$ is about 800 ohms, and that of the resistors $R_{56}$, $R_{78}$ and $R_{90}$ may be 1 kilo-ohm. In the embodiment under consideration a bit unit occupies only two islands 32, which each require a surface area of 92.4 $\mu$m by 230 $\mu$m. Thus, the bit density is about 25 bits/sq.mm.

The above-described integrated shift register may be operated at a clock pulse frequency of about 60 MHz with a dissipation per bit unit of about 2.7 mW. Consequently, the ratio between bit speed and dissipation per bit is about 22. The quality factor Q, defined as the product of bit speed expressed in MHz times bits per mW of dissipation times bits per sq.

mm., is about 550. It will be appreciated that in particular owing to the small number of components and the use of collector coupling between the shift register elements the shift register according to the invention may be highly compact. It should be noted that the small number of components is particularly remarkable in conjunction with the fact that the shift register is not operated in the saturation mode, so that a comparatively high bit speed may be realized. Furthermore, it is important that this comparatively high bit speed does not involve a high dissipation per bit unit, but on the contrary dissipation per bit unit is comparatively slight.

Otherwise both the bit speed and the dissipation per bit unit are dependent upon the values chosen for the resistors in the circuit. In general, larger resistors will involve lower speed and reduced dissipation. In the embodiment which will be described hereinafter with reference to FIG. 4 and in which resistors $R_3$, $R_5$ and so on, have been given a value of about 8 kilo-ohms and resistors $R_{12}$, $R_{34}$ and so on have been given a value of about 12 kilo-ohms, a dissipation per bit of about 0.2 mW has been measured at a clock pulse frequency of 20 MHz. While in the embodiment shown in FIG. 3 the ratio between bit speed and dissipation per bit unit is about 22, this ratio is about 100 for the embodiment shown in FIG. 4, i.e. a substantial improvement.

FIG. 4 shows part of a top plan view of a second embodiment of an integrated shift register according to the invention. A silicon body 60 comprises a P-type substrate which has been provided with an N-type epitaxial layer having a thickness of about 3 to 4 $\mu$m and a resistivity of about 1 ohm.cm. The epitaxial layer has been divided into a plurality of discrete N-type islands 62 and 72 by means of P-type isolation regions 61. The transistors of the circuit arrangement have been accommodated in the islands 62. For this purpose base regions 64, emitter regions 68 and collector contact regions 69 have been provided. Each collector contact region 69 adjoins a part of an island 62 which is bounded by the isolation regions and serves as a resistor. These epitaxial resistors constitute the resistors $R_3$, $R_5$, and so on of the circuit arrangement. The resistors $R_{12}$, $R_{34}$, and so on also are in the form of epitaxial resistors. They are constituted by the islands 72. Further, whereover necessary the resistors are provided with contact regions 73 produced simultaneously with the emitter regions 68. The use of epitaxial resistors permits the realization of comparatively high values—the resistors $R_5$ and $R_7$ are about 8 kilo-ohms and the resistors $R_{56}$ and $R_{78}$ are about 12 kilo-ohms—without the need for a large surface area.

The base regions 74 may be made by diffusion of boron. Their dimensions are about 25 $\mu$m by 18 $\mu$m, the penetration depth is about 1 $\mu$m and the sheet resistance is about 150 ohms for square.

The emitter regions 68 and the contact regions 69 and 73 may have been made by the diffusion of phosphorus. The dimensions of the emitter regions are about 9 $\mu$m by 14 $\mu$m, the penetration depth is about 0,6 $\mu$m and the sheet resistance is about 4 ohms per square. The contact regions 73 may be 10 $\mu$m by 14 $\mu$m.

The dimensions of the islands 72 may be about 17 $\mu$m by 22 $\mu$m at the sites of the contact regions 73 and about 14 $\mu$m by 14 $\mu$m at the sites of the reduced-width portions. These dimensions relate to the diffusion openings used. In actual fact the resistors are narrower at the surface, because during the comparatively deep diffusion effected to form the isolation regions 72 diffusion will take place in a direction parallel to the surface through a distance of about 3 $\mu$m. The same applies to the resistors $R_5$ and $R_7$, for which the dimensions of the diffusion openings are about 14 $\mu$m by 16 $\mu$m at the sites of the reduced-width portions.

Furthermore, the semiconductor surface is coated with an insulating layer on which has been provided a pattern of printed wires which have been connected to the various semiconductor regions through openings in the insulating layer which are shown by broken lines in the Figure. The resistors $R_3$, $R_5$ and so on, have been connected to the conductor 70, and the resistors $R_{12}$, $R_{34}$ and so on have alternately been connected to either of the clock pulse lines A and B. Owing to the advantageous arrangement and to the fact that the resistors are in the form of epitaxial resistors the described integrated shift register is particularly compact. The surface area required per shift register element is only about 86 $\mu$m by 76 $\mu$m, resulting in a bit density of about 70 bits/sq.mm. The afore-defined quality factor Q is about 7,600 for this embodiment, i.e. more than 14 times that for the embodiment shown in FIG. 3.

FIG. 5 shows part of a top-plan view of a third embodiment of the integrated-circuit shift register according to the invention. A silicon body 80 comprises a P-type substrate on which an N-type epitaxial layer has been deposited which has been subdivided into a plurality of discrete N-type islands 81 and 82 by means of isolating regions 93. The islands 82 each comprise two interconnected parts 82$^a$ and 82$^b$. Each of these parts 82$^a$ and 82$^b$ comprises two transistors and each connecting part between a part 82$^a$ and the associated part 82$^b$ comprises two resistors. These connecting parts are provided with contact regions 90. The transistors each have a base region 84 and an emitter region 85, whilst the common collector region, which is constituted either by a part 82$^a$ or by a part 82$^b$, is further provided with a collector contact region 86. Each of the islands 81 forms two resistors and is provided with $N^+$-type contact regions 87, 88 and 89.

The silicon body 80 is coated with an insulating layer on which conducting paths extend. The locations of these conducting paths is indicated in the Figure by dot-dash lines. Through windows or openings formed in the insulating layer, which are indicated by broken lines, the conductors are connected to the semiconductor regions which at these sites extend to the surface. A conducting path 91 interconnects resistors $R_3$, $R_5$ and so on, and may be connected to earth. Furthermore, clockpulse tracks A and B and reference voltage tracks REF are shown. The remaining conducting paths 92 so connect the circuit elements as to form shift-register elements as shown in FIG. 1, which together form a shift register.

This embodiment also shows a very compact structure. The bit density is substantially the same as in the embodiment described with reference to FIG. 4. The latter embodiment showed that a very large part of the surface area of the integrated circuit is covered by conducting paths. In the present embodiment the pattern of the conducting paths is simplified as far as possible in a sense such that only straight parallel-extending paths are used. This is ensured inter alia by accommodating the emitter resistors $R_{12}$, $R_{34}$ and so on in elongated islands 81, which each are surrounded by two parts 82$^a$ and two parts 82$^b$ of islands 82. In this arrangement the geometry of a part 82$^b$ with the included transistors may be derived from that of the associated part 82$^a$ by mirror rotation about both the $x$ and $y$ axes, the $x$ axis coinciding substantially with the axis of the conducting path 91 and the $y$ axis coinciding substantially with the axis of islands 81. In particular, the diagonal connection of the parts 82$^a$ and 82$^b$ contributes to the desired simplification of the conducting-path pattern. These connecting paths include the collector registors $R_3$, $R_5$ and so on. They are constituted by the resistance of the epitaxial semiconductor material present between the contact regions 90 and 86. Since the resistance of these epitaxial resistors is high, the common collector parts 82$^a$ and 82$^b$ are substantially insulated from one another electrically.

The two transistors in a part 82$^a$ or 82$^b$ have their emitter regions 85 arranged symmetrically with respect to the collector contact region 86, so that differences in collector series resistance are avoided as far as possible.

Owing to the fact that the clock pulse tracks A and B have the form of straight parallel conducting paths the connections of these tracks to the epitaxial emitter resistors $R_{12}$, $R_{34}$ and so on are not symmetrically disposed with respect to the ends of the elongate islands 81. Hence the two emitter resistors situated in an island 81 differ in length. In order to obtain the same resistance value for the two resistors, the longer resistor includes three $N^+$-regions formed simultaneously with the emitter regions 85. Two of these regions have been combined with the two contact regions 88 and 89. These contact regions have extended portions in facing directions. The third $N^+$-region has provided as a discrete region 93. By these highly doped and hence low-resistivity $N^+$-regions some parts of the resistor having the larger linear dimension are substantially short-circuited. A division into three parts has been chosen to ensure that these short-circuiting or at least resistivity-reducing $N^+$-regions are not located under the conducting paths, for generally the thickness of the insulating layer over emitter regions and simultaneously formed other $N^+$-regions is comparatively small. Consequently, in locations in which conducting paths extend over such $N^+$-regions there is a comparatively great likelihood of the occurrence of undesirable short-circuit between the respective conducting paths and the subjacent $N^+$regions. The said division into three parts avoids such an increased likelihood of short circuits.

In the embodiment under consideration the dimensions of the base regions are about 30 $\mu$m by 13 $\mu$m. Each shift register element occupies a surface area of about 80 $\mu$m by 86 $\mu$m. The resistance of the emitter resistors $R_{12}$, $R_{34}$ and so on is about 20 kilo-ohms and that of the collector resistors $R_3$, $R_5$ and so on is about 10 kilo-ohms.

It has been found that the integrated-circuit shift register described may be operated at clockpulse frequencies of up to at least 70 MHz. This bit rate is appreciably higher than that of the embodiment described with reference to FIG. 4, in spite of the fact that in the latter embodiment the resistance of the collector resistors, which largely determines the bit rate, is lower. At the said clock-pulse frequency of 70 MHz the dissipation measured per bit was about 0.2 mW. The above-defined quality factor Q is about 25,000, i.e. more than 45 times that for the embodiment shown in FIG. 3 and more than 3 times that for the embodiment shown in FIG. 4.

Obviously, the invention is not restricted to the embodiments described by way of example, but to one skilled in the art many modifications are possible within the scope of the invention. Thus, for example, other semiconductor materials, such as germanium or $A^{III}B^{V}$ compounds, may be used. Moreover, other conventional isolation techniques for isolating the semiconductor islands from one another may be used. The semiconductor body may consist of an insulating substrate on which discrete areas of semiconductor material have been provided, or the semiconductor islands may be embedded in an insulating material. The conductivity types of the various semiconductor regions may be interchanged, provided that the polarities of the voltages are reversed at the same time. Furthermore, other conventional activators may be used.

In addition, the integrated circuits described may be mounted and encapsulated in a conventional manner.

What is claimed is:

1. A shift register comprising a sequence of shift register elements each of said elements comprising a first and a second transistor the emitters of which are interconnected, means for applying a clock pulse to these emitters, the base of the second transistor being connected to the collector of the first transistor, means for applying and maintaining an identical fixed direct current reference potential to the base of each first transistor in the register, the collector of the second transistor being connected to the collector of the first transistor of a shift register element succeeding the said shift register element through a substantially non-resistive path.

2. A shift register as claimed in claim 1, further comprising a first resistor and a second resistor in each element, wherein the collector of the first transistor of each shift register element has been connected to a point of constant potential via the first resistor, the clock pulse being applied to the emitters of the first and second transistors of each shift register element via the second resistor.

3. A shift register as claimed in claim 2, wherein the ratio between the second and first resistors is greater than 1.2 and smaller than 2.

4. A shift register as claimed in claim 1, wherein it contains a semiconductor body which has a plurality of discrete semiconductor areas in which the semiconductor regions of the circuit elements of at least several shift register elements have been accommodated.

5. A shift register as claimed in claim 4, wherein the discrete semiconductor regions form parts of an epitaxial semiconductor layer of the one conductivity type deposited on a substrate, the first and second resistors of at least one of the shift register elements being epitaxial semiconductor resistances of the one conductivity type which include parts of the epitaxial layer.

* * * * *